US006801933B1

(12) United States Patent
Leppinen

(10) Patent No.: US 6,801,933 B1
(45) Date of Patent: Oct. 5, 2004

(54) SYSTEM AND METHOD FOR PROACTIVE CACHING EMPLOYING GRAPHICAL USAGE DESCRIPTION

(75) Inventor: Mika Leppinen, Woburn, MA (US)

(73) Assignee: Nokia Internet Communications, Inc., Mountain View, CA (US)

( * ) Notice: Subject to any disclaimer, the term of this patent is extended or adjusted under 35 U.S.C. 154(b) by 680 days.

(21) Appl. No.: 09/644,054

(22) Filed: Aug. 23, 2000

(51) Int. Cl.$^7$ .................. G06F 15/167; G06F 15/16; G06F 12/00
(52) U.S. Cl. .................. 709/213; 709/203; 709/216; 711/118; 711/130
(58) Field of Search .................. 709/213, 216, 709/203; 711/118, 130

(56) References Cited

U.S. PATENT DOCUMENTS

| | | | |
|---|---|---|---|
| 5,555,437 A | * | 9/1996 | Packer ..................... 710/5 |
| 5,787,470 A | * | 7/1998 | DeSimone et al. ......... 711/124 |
| 5,873,100 A | * | 2/1999 | Adams et al. .............. 707/204 |
| 5,933,849 A | * | 8/1999 | Srbljic et al. ............... 711/118 |
| 6,185,608 B1 | * | 2/2001 | Hon et al. .................. 709/216 |
| 6,233,606 B1 | * | 5/2001 | Dujari ........................ 709/213 |
| 6,513,062 B1 | * | 1/2003 | Weber ........................ 709/216 |
| 6,601,090 B1 | * | 7/2003 | Gurijala et al. ............. 709/213 |

OTHER PUBLICATIONS

Wng, Z. et al: "Prefetching in World Wide Web", Global Telecommunications Conference 1996. Globecom '96. Communications: The Key to Global Prosperity London, UK 18–22 Nov 1996, New York, NY, USA, IEEE, US, Nov. 18, 1996 (Nov. 18, 1996), pp. 28–32, XP010220168.

Schechter, S. et al: "using path profiles to prodict HTTP requests", Computer Netoworks and ISDN Systems, North Holland Publishing, Amsterdam NL, vol. 30, No. 1–7, Apr. 1, 1998 (1998–04–01) pp. 457–467, XP004121402 ISSN: 0169–7552.

Padmanabhan, V. N. et al: "Using Predictive Prefetching to Improve World Wide Web Latency", Ccmputer Communication Review, Association for Comuting Machinery, New York, US, vol. 26, No. 3, Jul. 1, 1996 (Jul. 1, 1996) pp. 22–36, XP000607179 ISSN: 0146–4833.

* cited by examiner

Primary Examiner—Krisna Lim
(74) Attorney, Agent, or Firm—Antonelli, Terry, Stout & Kraus, LLP

(57) ABSTRACT

A request handler in a server handles requests from a client as a user navigates through an application having a plurality of states. A data generator is coupled to the request handler. A cache is coupled to the data generator. The data generator processes the requests received by the request handler and based, at least in part, on the requests, stores data in the cache. An application state controller is coupled to the request handler, and a preprocessor is coupled to the application state controller. The requests handled by the request handler indicate the current state of the application in which the requesting user is located, and such an indication is forwarded to the application state controller. The application state controller reads the graphical usage description, which graphically illustrates the flow of the application from state to state and determines a likely next state based on the current state. The application state controller produces a control signal based on the indication of the current state of the user and the likely next state. The preprocessor generates a preprocess signal based on the control signal. Responsive to the preprocess signal, the data generator caches the data that are likely to be needed as the user navigates through the states of the application.

28 Claims, 6 Drawing Sheets

SYSTEM AND METHOD FOR PROACTIVE CACHING EMPLOYING GRAPHICAL USAGE DESCRIPTION

BACKGROUND OF THE INVENTION

1. Field of the Invention

This invention relates generally to application servers, and more particularly to proactive data caching employing a graphical usage description.

2. Description of the Related Art

Web site users desire fast, easy access to accurate information. Web site publishers desire automated management processes and streamlined administration with maximum control. Developers of Web sites seek to provide a product that reflects commercial aims with a variety of data structures, while recognizing that new features are sometimes necessary as a is Web site grows and the needs of users change. A popular application server might endure millions of page impressions and user visits every week, and the goal is to deliver accurate results every time.

Servers that support Web sites are often slow to respond to a user's request for data, and take time to store and retrieve data. If the server could anticipate how the user was going to navigate through the Web site, the system could preprocess and proactively cache data so as to improve response time and interact more seamlessly with a user.

A distributed application, such as a Web-based application, can often be described functionally as a set of user interface screens that invoke server actions: for example, in a WAP application a WAP login screen that accepts a user name and password and then invokes a login on the server. Each action invokes a server operation, which, in turn, invokes server side application logic (e.g., the login operation) and must generate the next user interface screen (e.g., the initial menu screen). Such an application can easily be represented as a state diagram: e.g., as a graph consisting of user interface screens linked together by lines representing possible control flows from screen to screen, such as, e.g., the login screen linked to an initial menu screen, etc. Such diagrams can be used to represent the functional flow of the application.

There continues to be a need for a solution to the aforementioned difficulties in server-side application processing and data retrieval.

SUMMARY OF THE INVENTION

According to an exemplary embodiment of the invention, a system includes a graphical usage description of a plurality of states of an application. A request handler retrieves data is based on a request and produces an indication of a current state of a user based on the request. An application state controller determines a next state based on the current state and the graphical usage description. A data generator caches data based on the current state and the next state.

According to another exemplary embodiment of the invention, in a method, a request for data is received. A current state is produced based on the request. A next state is determined based on the current state. Data are cached based on the current state and the next state.

Other aspects and advantages of the invention will become apparent from the following detailed description and accompanying drawings, illustrating by way of example the features of the invention.

DETAILED DESCRIPTION

Figure 1:
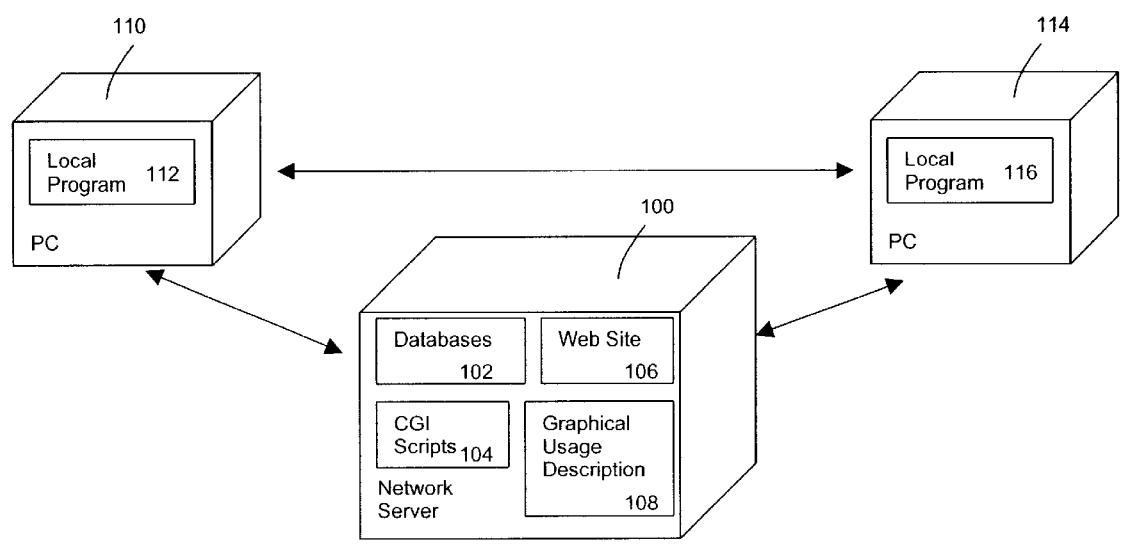
FIG. 1 illustrates a network that includes a server and clients.

According to an illustrative embodiment of the invention, a network server proactively caches data to improve responsiveness and performance of a Web site. With reference to FIG. 1, a system includes a network server 100. The network server 100 has resident therein databases 102, CGI scripts 104, a Web site (an HTML-based program) 106, and a graphical usage description 108 characterizing how a user navigates through pages of the Web site 106. CGI (Common Gateway Interface) is a programming language typically used to send database queries and results back and forth on the Internet. CGI scripts include programs that run on an Internet server and allow clients to submit identification information, request data, and otherwise interact with databases stored on the server.

A first personal computer 110 is communicatively coupled to the network server 100 in a node-to-server Internet connection. The first personal computer 110 runs a local program 112 for a particular application which causes the first personal computer 110 to submit information, request data, and interact with the Web site 106 and databases 102 stored on the network server 100.

A second personal computer 114 is communicatively coupled to the network server 100 in a node-to-server Internet connection. The second personal computer 114 runs a local program 116 for a particular application which causes the second personal computer 114 to submit information, request data, and interact with the Web site 106 and databases 102 stored on the network server 100.

The first personal computer 110 and the second personal computer 114 are communicatively coupled in a node-to-node Internet connection.

The Web site 108 in the embodiment of the invention shown in FIG. 1 is physically located within the network server 100. Alternatively, the system can operate on any network that links two or more clients and is not limited to the Internet. For example, the system could be set up according to the principles of the invention on a local-area-network (LAN). In such a case, an HTML-based program would still be running on the server to coordinate activity, but since the network is not on the Internet, the HTML-based program would not be called a Web site (since it is not on the World-Wide-Web).

An object of the invention is to optimize operation of the application server (e.g., for an Internet server application or a WAP application). The throughput of the application server is improved using aggressive preprocessing, and if a developer uses a Web development tool to describe the logic of the application in a flow diagram of the user's interaction, the logic of the application in the form of such flow diagram can be used to improve the performance of the runtime environment in accordance with the principles of the invention. Such flow diagram is a graphical usage description of how the user will likely navigate in the future. The runtime system tracks where the user is located in a particular portion of the graphical usage description, and the system will begin generation of the next state before the user accesses the next state.

Some states within the flow of the graphical usage description have side effects that prevent those states from being proactively processed. The developer of the application can mark such a state as having side effects and not amenable to optimization according to the invented process.

Figure 2:
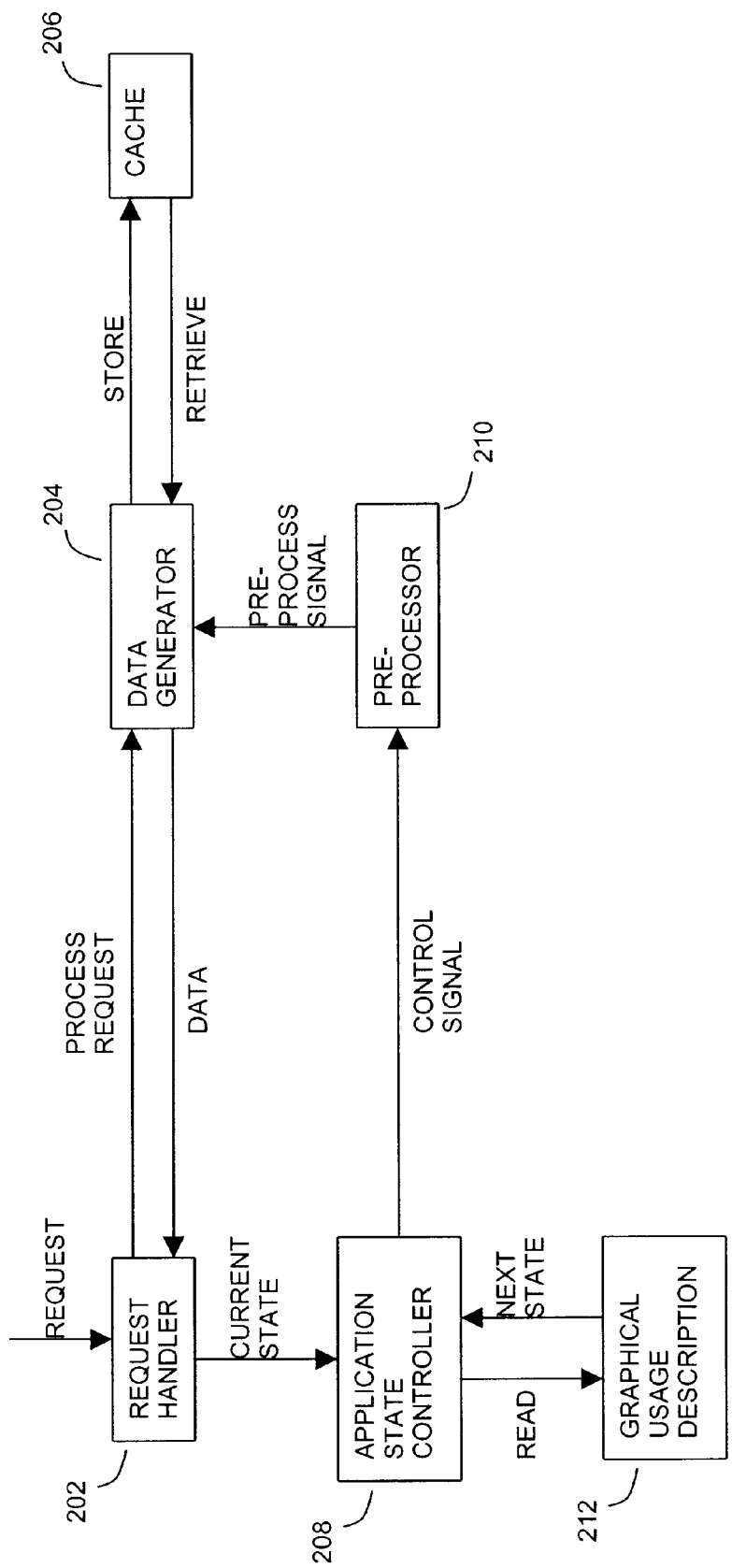
FIG. 2 illustrates a system architecture running on the server.

The architecture of the optimization system is illustrated in FIG. 2. In the network server, a request handler 202 handles requests from a client as a user navigates through pages of a Web site. A data generator 204 is coupled to the request handler 202. A cache 206 is coupled to the data generator 204. The data generator 204 processes the requests received by the request handler 202 and based, at least in part, on the requests, stores data in the cache 206.

According to the principles of the invention, an application state controller 208 is coupled to the request handler 202, and a preprocessor 210 is coupled to the application state controller 208. The requests handled by the request handler 202 indicate the current state of the application in which the requesting user is located, and such an indication is forwarded to the application state controller 208. The application state controller 208 reads the graphical usage description 212, which graphically illustrates the flow of the application from state to state and determines a likely next state based on the current state. The application state controller 208 produces a control signal based on the indication of the current state of the user and the likely next state. The preprocessor 210 generates a preprocess signal based on the control signal. Responsive to the preprocess signal, the data generator 204 intelligently, efficiently, and proactively caches the data that are likely to be needed as the user navigates through the Web site.

If the generation of the next state of the application running on the server takes multiple steps and requires the use of complex tools (e.g., XSLT translation), proactive processing according to the invention can be beneficial. Proactive processing also helps the system to perform load-balancing over time, because preprocessing can be scheduled among other tasks. Optimization according to the invention delivers much faster response times under a heavy load of user interaction. The system records information about the most active paths through the application as represented by the graphical usage description, and preprocesses those paths more heavily, adding additional cache control directives to allow longer caching time and keeping content in the memory instead of a secondary cache (e.g., hard drive). Because generation of the server side information can be a time-consuming process if complex technologies such as XSLT translation are applied, preprocessing pages of the Web site allows a system load to be better controlled, and provides better response times for users.

Figure 3:
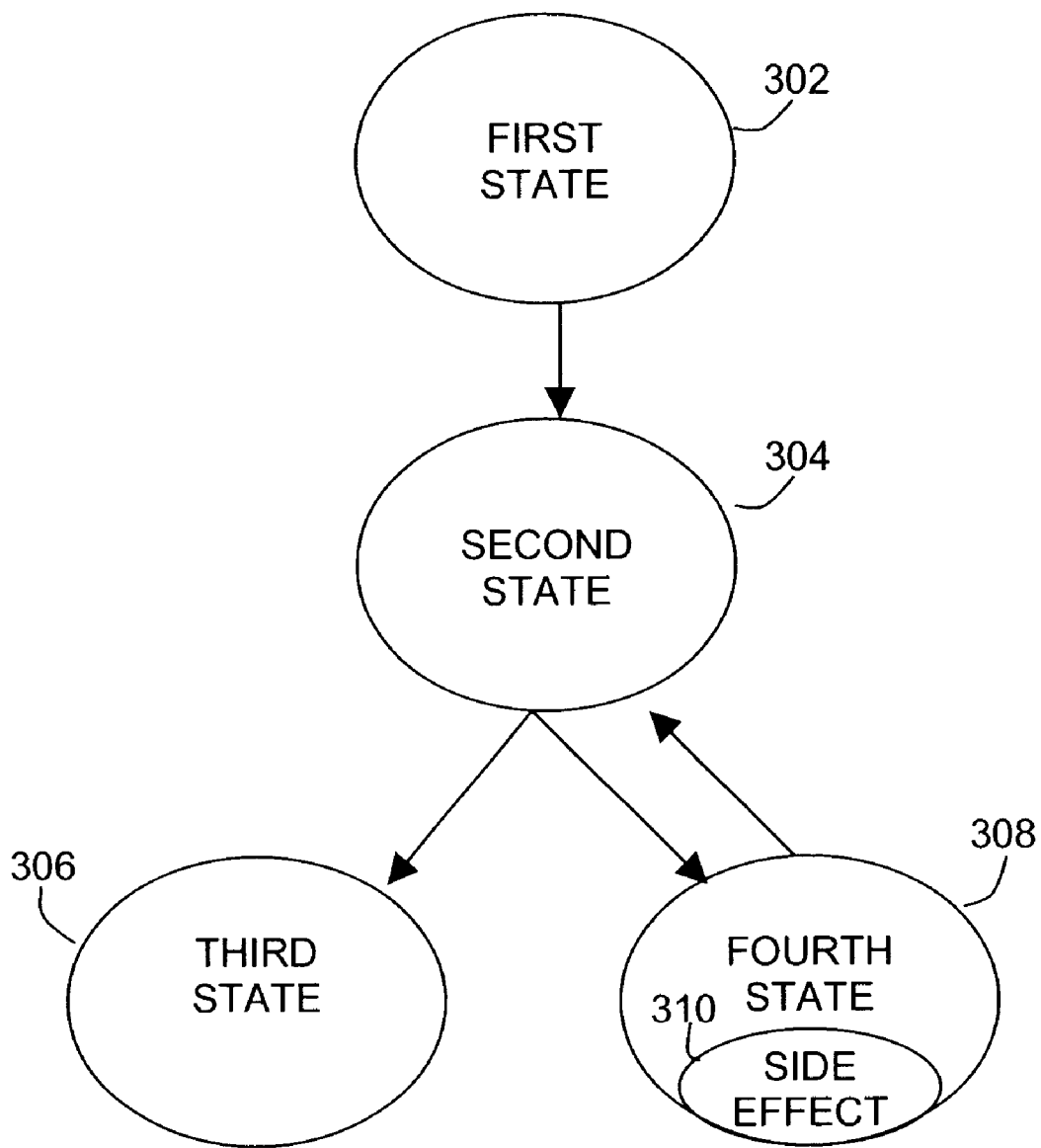
FIG. 3 illustrates a graphical usage description.

FIG. 3 shows an example of a graphical usage description that graphically illustrates the flow of an application and how a user can navigate among four states: a first state 302, a second state 304, a third state 306, and a fourth state 308. In the graphical usage description, the developer describes which pages can be preprocessed, and which pages have a side effect that prevents utilization of preprocessing in accordance with the principles of the invention. With reference to FIG. 3, the fourth state 308 has such a side effect 310, which tends to reduce the benefits of preprocessing.

Figure 4:
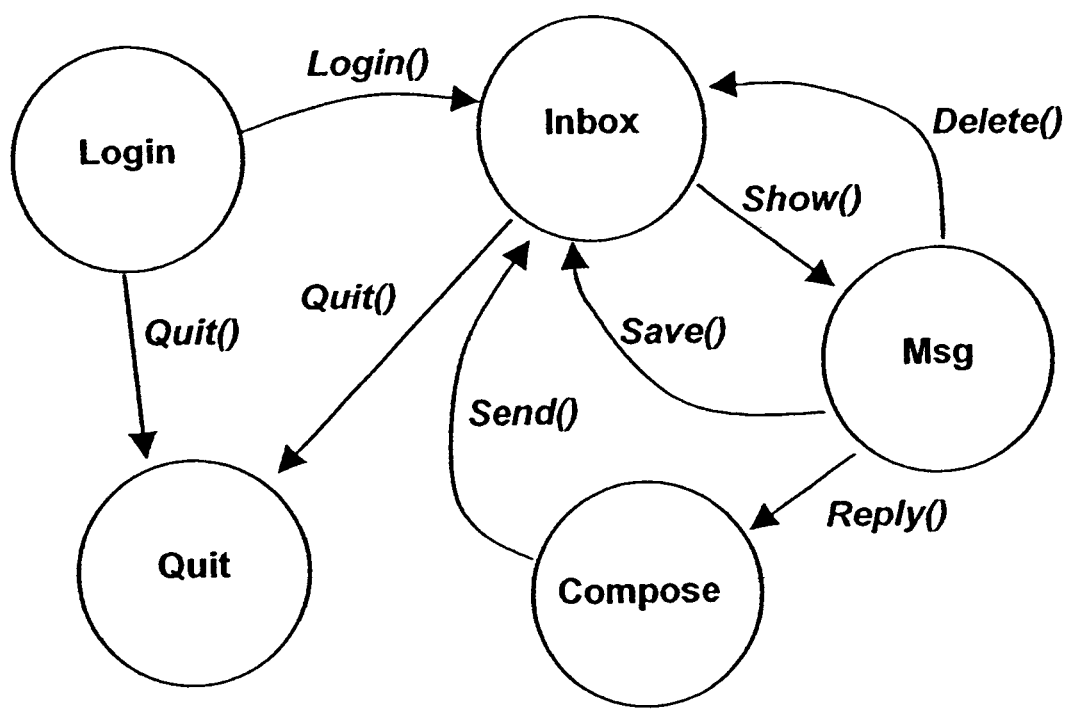
FIG. 4 illustrates a graphical usage description.

FIG. 4 illustrates a more specific example of a graphical usage description in accordance with the principles of the invention. The graphical usage description shown in FIG. 4 is for a sample messaging application that allows reading, replying to, deleting, and saving of messages. The graphical usage description of the logic of the application describes how a user will navigate among states.

Figure 5:
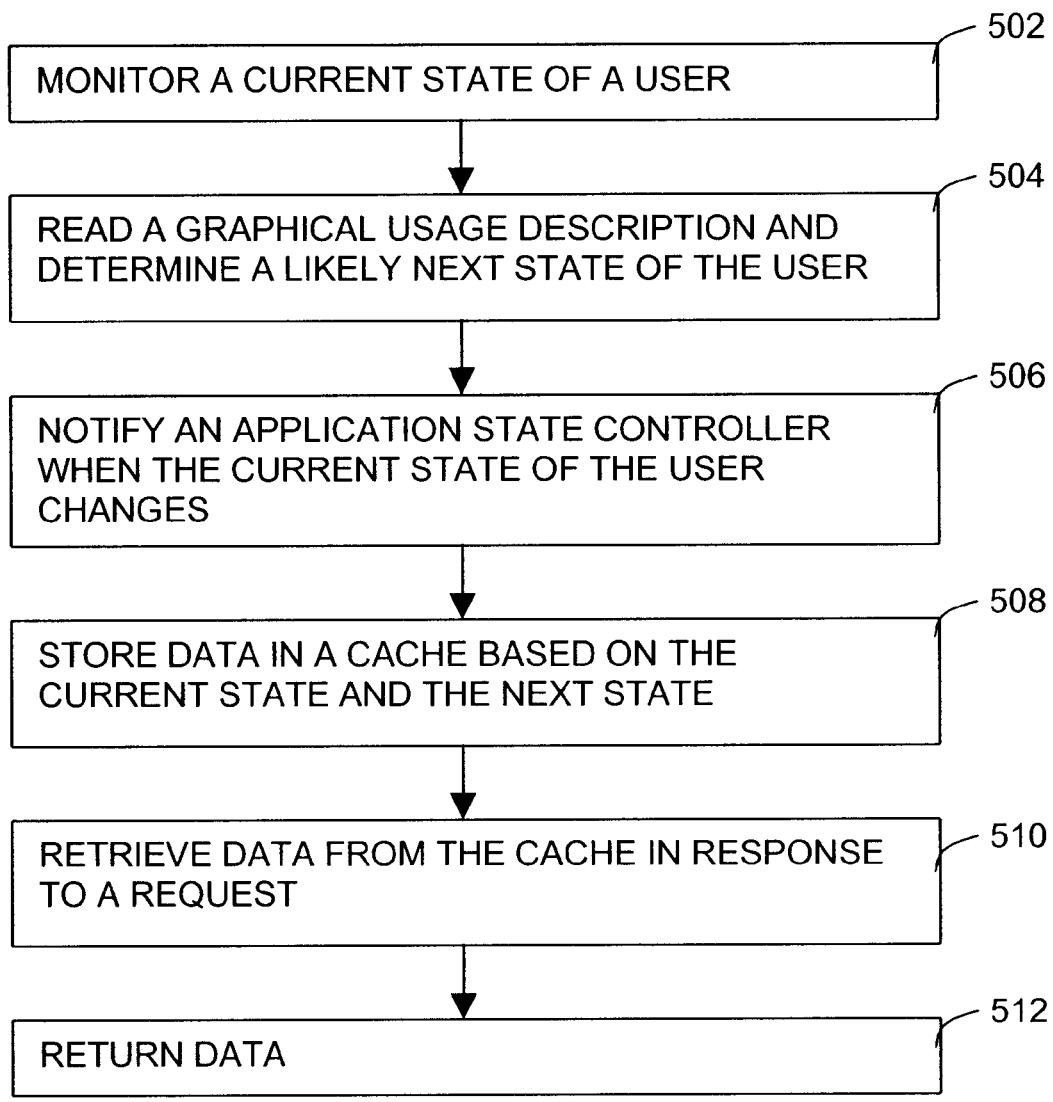
FIG. 5 is a process flow diagram illustrating operation of the system architecture.

According to the principles of the invention, the system architecture shown in FIG. 2 preprocesses and proactively caches data in a process that employs the graphical usage description. FIG. 5 is a process flow diagram, which illustrates operation of the system architecture. With reference to FIGS. 5 and 2, in step 502, the application state controller 208 monitors and reacts to a current state of a user and controls the preprocessor 210. In step 504, the application state controller 208 reads the graphical usage description 212 to determine a likely next state of the user. In step 506, when the current state of the user changes, the request handler 202 notifies the application state controller 208. In step 508, the data generator 204 is controlled to store data in the cache 206 based on the current state and the next state. In step 510, if the request handler 202 receives a request, then the request handler 202 asks for data from the data generator 204, and the data generator 204 retrieves data from the cache 206 in response to the request. In step 512, because of preprocessing and proactive caching as described herein, the preprocessed data can be returned quickly.

Figure 6:
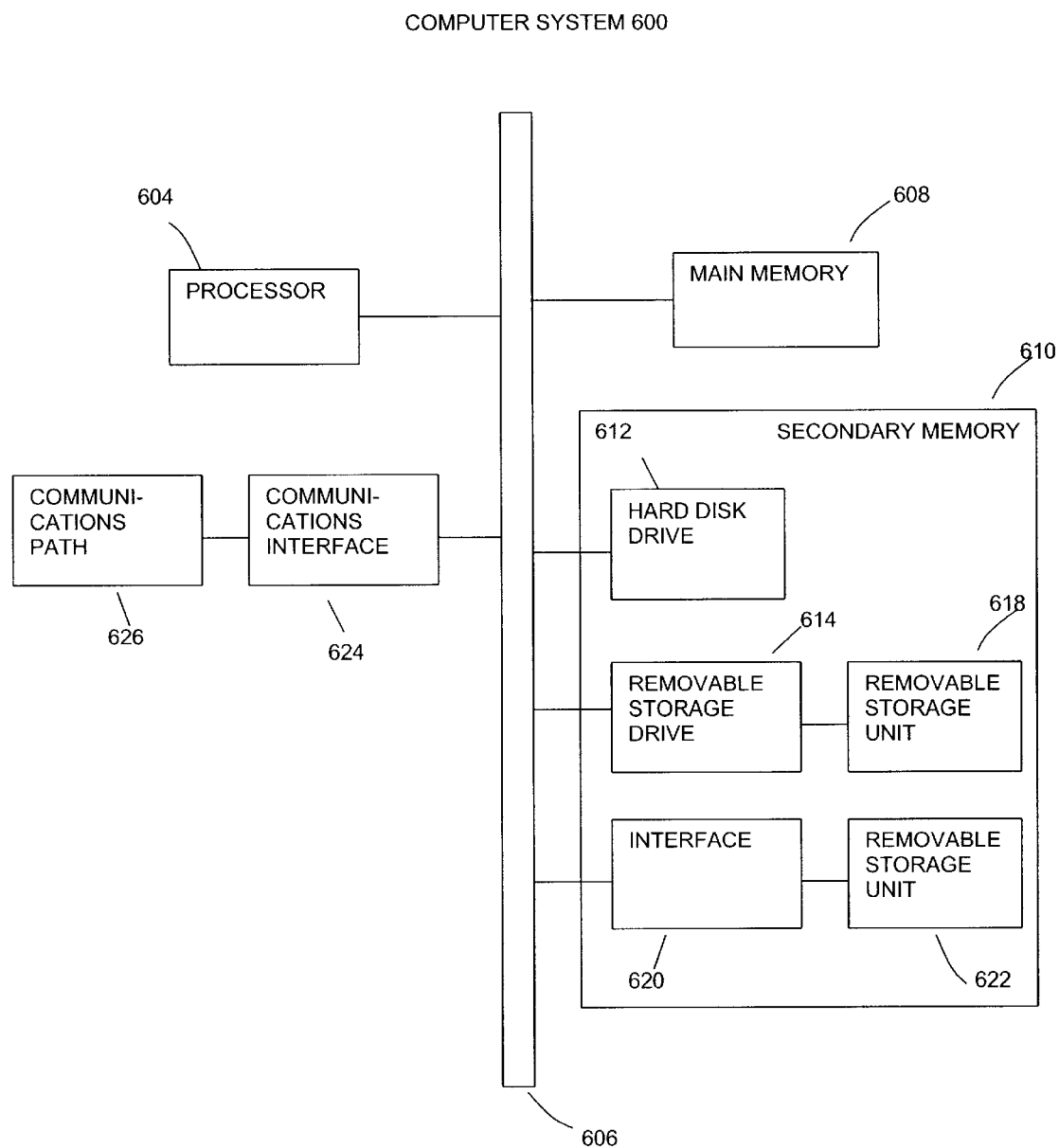
FIG. 6 illustrates an example computer system for implementing the invention.

Referring to FIG. 6, the network server 100 of the present invention may be implemented using hardware, software or a combination thereof and may be implemented in a computer system or other processing system. In an illustrative embodiment, the invention is directed toward one or more computer systems capable of carrying out the functionality described herein. An example computer system 600 is shown in FIG. 6. The computer system 600 includes one or more processors, such as processor 604. The processor 604 is connected to a communication bus 606. Various software embodiments are described in terms of this example computer system. After reading this description, it will become apparent to a person skilled in the relevant art how to implement the invention using other computer systems and/or computer architectures.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means can include, for example, a removable storage unit 622 and an interface 620. Examples of such include a program cartridge and cartridge interface (such as that found in video game devices), a removable memory chip (such as an EPROM, or PROM) and associated socket, and other removable storage units and interfaces which allow software and data to be transferred from the removable storage units to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a PCM-CIA slot and card, etc. Software and data transferred via communications interface 624 are in the form of signals which can be electronic, electromagnetic, optical or other signals capable of being received by communications interface 624. These signals are provided to communications interface 624 via a communications path 626. This communications path 626 carries signals and can be implemented using wire or cable, fiber optics, a telephone line, a cellular phone link, an RF link and other communications channels.

In this document, the terms "computer program medium" and "computer usable medium" are used to generally refer to media such as removable storage device 618, a hard disk installed in hard disk drive 612, and communications path 626. These computer program products are means for providing software to computer system 600.

Computer programs (also called computer control logic) are stored in main memory 608 and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While several particular forms of the invention have been illustrated and described, it should be understood that they have been presented by way of example, and not limitation. It will be apparent to persons skilled in the relevant arts that various changes in form and detail can be made without departing from the spirit and scope of the invention.

What is claimed is:

1. A system, comprising:
    a graphical usage description of a plurality of states of an application;
    a request handler, which retrieves data based on a request and produces an indication of a current state of a user based on the request;
    an application state controller, which determines a next state based on the current state and the graphical usage description; and
    a data generator, which caches data based on the current state and the next state.

2. The system of claim 1, wherein:
    a user of the application is located in one of the plurality of states.

3. The system of claim 2, wherein:
    the application state controller determines the next state before the user accesses the next state.

4. The system of claim 1, wherein:
    the application state controller reads the graphical usage description to determine the next state.

5. The system of claim 1, wherein:
    the request handler notifies the application state controller when the current state changes.

6. The system of claim 1, wherein:
    the data generator retrieves data based on the request.

7. A method, comprising:
    receiving a request for data;
    producing a current state based on the request;
    determining a next state based on the current state;
    caching data based on the current state and the next state; and
    associating the request with a user of an application having a plurality of states, wherein the user is located in one of the plurality of states.

8. The method of claim 7, further comprising:
    the data generator retrieves data based on the request.

9. The method of claim 7, further comprising:
    determining the next state before the user accesses the next state.

10. The method of claim 9, further comprising:
    reading a graphical usage description to determine the next state.

11. The method of claim 7, further comprising:
    retrieving data based on the request.

12. The method of claim 7, further comprising:
    associating the request with a user of the one client of an application having a plurality of states, wherein the client is located in one of the plurality of states.

13. The method of claim 12, further comprising:
    the application state controller determines the next state before the client accesses the next state.

14. The method of claim 13, further comprising:
    the application state controller reads the graphical usage description to determine the next state.

15. The method of claim 12, further comprising:
    the request handler produces a notification when the current state changes.

16. A method comprising:
    receiving a request for data;
    producing a current state based on the request;
    determining a next state based on the current state;
    caching data based on the current state and the next state; and
    producing a notification when the current state changes.

17. A computer readable medium having stored thereon instructions which, when executed by a processor, cause the processor to perform a method, said method comprising:
    receiving a request for data;
    producing a current state based on the request;
    determining a next state based on the current state;
    caching data based on the current state and the next state; and
    associating the request with a user of an application having a plurality of states, wherein the user is located in one of the plurality of states.

18. The computer readable medium of claim 17, said method further comprising:
    determining the next state before the user accesses the next state.

19. The computer readable medium of claim 17, said method further comprising:
    reading a graphical usage description to determine the next state.

20. The computer readable medium of claim 17, said method further comprising:

retrieving data based on the request.

21. A computer readable medium comprising:

receiving a request for data;

producing a current state based on the request;

determining a next state based on the current state;

caching data based on the current state and the next state; and producing a notification when the current state changes.

22. A system comprising:

a plurality of processors which are coupled together including a server and at least one client which navigates through data states stored by the server; and wherein the server comprises a cache for storing the data states, a data generator, which retrieves and stores the data states from the cache based on a current data state of one of the at least one client and a next data state of the one client, a request handler, which retrieves the stored data states from the data generator based on a request from the one client and produces an indication of the current data state of the one client based on the request and an application state controller, coupled to the request handler, which determines the next data state of the one client based on the current data state and a graphical usage description of how the one client will likely navigate through a plurality of data states of an application in the future.

23. The system of claim 22, wherein:

a user of the application is located in one of the plurality of states.

24. The system of claim 23, wherein:

the application state controller determines the next state before the user accesses the next state.

25. The system of claim 24, wherein:

the application state controller reads the graphical usage description to determine the next state.

26. The system of claim 22, wherein:

the request handler notifies the application state controller when the current state changes.

27. The system of claim 22, wherein:

the data generator retrieves data based on the request.

28. A method of retrieving data in a system including a plurality of processors which are coupled together including a server and at least one client which navigates through data states stored by the server including a cache, a data generator, a request handler and an application state controller coupled to the request handler comprising the steps:

storing the data states in the cache;

the data generator retrieves and stores the data states from the cache based on a current data state of one of the at least one client and a next data state of the one client;

the request handler retrieves the stored data states from the data generator based on a request from the one client and produces an indication of the current data state of the one client based on the request; and the application state controller determines the next data state of the one client based on the current data state and a graphical usage description of how the one client will likely navigate through a plurality of data states of an application in the future.

* * * * *